(12) United States Patent
Nukumi et al.

(10) Patent No.: US 8,425,638 B2
(45) Date of Patent: Apr. 23, 2013

(54) METHOD OF OPERATING GASIFICATION FACILITY

(75) Inventors: Hisanori Nukumi, Tokyo (JP); Tomoyuki Katagiri, Tokyo (JP)

(73) Assignee: IHI Corporation, Tokyo (JP)

( * ) Notice: Subject to any disclaimer, the term of this patent is extended or adjusted under 35 U.S.C. 154(b) by 423 days.

(21) Appl. No.: 12/933,545

(22) PCT Filed: Mar. 18, 2009

(86) PCT No.: PCT/JP2009/001196
§ 371 (c)(1),
(2), (4) Date: Sep. 20, 2010

(87) PCT Pub. No.: WO2009/116275
PCT Pub. Date: Sep. 24, 2009

(65) Prior Publication Data
US 2011/0016789 A1   Jan. 27, 2011

(30) Foreign Application Priority Data

Mar. 21, 2008   (JP) .................................. 2008-072724

(51) Int. Cl.
*C01B 3/36*   (2006.01)
*C01B 6/24*   (2006.01)
*C10J 3/00*   (2006.01)
*C10J 1/207*   (2006.01)
*B01J 7/00*   (2006.01)

(52) U.S. Cl.
USPC .................. 48/197 R; 48/210; 48/61; 48/77; 423/644

(58) Field of Classification Search ................ 48/61, 77, 48/197 R, 210
See application file for complete search history.

(56) References Cited

U.S. PATENT DOCUMENTS

| 4,261,856 | A | * | 4/1981 | McMinn, Jr. | ................. 252/373 |
| 4,391,612 | A | * | 7/1983 | Chang | .............................. 48/202 |
| 4,519,810 | A | * | 5/1985 | Haas | ................................ 48/202 |
| 2002/0134019 | A1 | * | 9/2002 | Paisley | ........................ 48/197 R |
| 2008/0244976 | A1 | * | 10/2008 | Paisley | ........................... 48/62 R |

FOREIGN PATENT DOCUMENTS

| JP | 57-3890 | 1/1982 |
| JP | 58-154797 | 9/1983 |
| JP | 9-328690 | 12/1997 |
| JP | 2002-161283 | 6/2002 |

(Continued)

OTHER PUBLICATIONS

U.S. Appl. No. 12/934,546, filed Sep. 24, 2010, Katagiri, et al.

*Primary Examiner* — Matthew Merkling
(74) *Attorney, Agent, or Firm* — Oblon, Spivak, McClelland, Maier & Neustadt, L.L.P.

(57) ABSTRACT

Upon cold startup of a gasification facility, a fluidized air 10 is supplied to a combustion furnace 9 to fluidize a combustion-furnace fluidized bed 11 while a preheating fuel 22 is supplied to the combustion furnace to preheat the fluidized bed 11 up to an autoignition temperature of coal. Then, a coal 23 is charged to the combustion furnace 9 to heat the fluidized bed 11 and bed material is circulated between the combustion and gasification furnaces 9 and 1 for heating. Upon startup and shutdown of the gasification facility, steam 2 from an exhaust heat recovery boiler 20 in heat exchange with an exhaust gas 15 from the combustion furnace 9 is supplied to the gasification furnace 1 to purge the gasification furnace 1 and a lead-out passage 6 with the steam 2 utilizing the exhaust heat.

7 Claims, 9 Drawing Sheets

FOREIGN PATENT DOCUMENTS

| JP | 2003-307302 | 10/2003 |
| JP | 2005-41959 | 2/2005 |
| JP | 2005-121342 | 5/2005 |
| JP | 2006-152081 | 6/2006 |

* cited by examiner

METHOD OF OPERATING GASIFICATION FACILITY

TECHNICAL FIELD

The present invention relates to a method of operating a gasification facility.

BACKGROUND ART

Conventionally, a variety of gasification facilities have been proposed. For example, there is a so-called two-tower circulating fluidized bed gasification facility comprising gasification and combustion furnaces (see Patent Literature 1).

In the gasification furnace constituting the two-tower gasification facility, steam is fed from below to provide a fluidized bed of bed material (such as silica sand or limestone) for gasification of a raw material (such as coal, biomass or tire chips) charged from above to thereby produce a produced gas and unreacted char. The produced gas produced in the gasification furnace is taken out through a lead-out passage to outside, and a mixture of the unreacted char produced in the gasification furnace with the bed material is introduced into the combustion furnace through a lead-in pipe.

In the combustion furnace constituting the two-tower gasification facility, blow-up air is fed from below to provide a fluidized bed for combustion of the unreacted char from the gasification furnace to thereby heat the bed material. Blown-up combustion exhaust gas is introduced into a material separator such as a hot-cyclone where it is separated into the bed material and exhaust gas; the separated bed material is supplied to the gasification furnace.

The above-mentioned two-tower gasification facility has a feature that gasification of raw material can be prolonged by increasing a capacity of the gasification furnace to thereby effectively gasify the raw material even if the raw material is for example coal containing much fixed carbon.

Upon start-up of the two-tower gasification facility, especially, upon cold startup, firstly the bed material must be heated to a temperature which enables the gasification of raw material; conventionally, fuel such as LNG, LPG or light oil is burned for such heating. It is, however, problematic that a considerable cost is required for the heating of the bed material since a large amount of fuel such as LNG, LPG or light oil is needed for heating a large amount of bed material housed in gasification and combustion furnaces with large capacities as in the two-tower gasification facility up to a temperature which enables the gasification of raw material and such fuel is relatively expensive. Moreover, upon start-up and shutdown of the gasification facility which produces a flammable produced gas, the gasification furnace and the lead-out passage for the produced gas must be purged with inert gas to ensure safety; conventionally, inert gas such as nitrogen ($N_2$) is fed for such purge. It is, however, problematic that cost for the purge increases since the purge of the gasification furnace generally requires an amount of inert gas about five times greater than the capacity of the gasification furnace and therefore a large nitrogen producer is required.

Thus, for a gasification facility, a technique has been desired to be developed which can reduce the cost required for heating the bed material especially upon cold startup of the gasification facility and which can effectively and inexpensively perform an operation of purging a gasification furnace and a lead-out passage for produced gas; however, currently such a technique has not been proposed.

[Patent Literature 1] JP 2005-041959A

SUMMARY OF INVENTION

Technical Problems

The invention was made in view of the above and has its object to provide a method of operating a gasification facility capable of reducing a cost required for heating a bed material especially upon cold startup of the gasification facility and capable of effectively and inexpensively purging a gasification furnace and a lead-out passage for a produced gas.

Solution to Problems

The invention is directed to a method of operating a gasification facility having a gasification furnace for gasifying a raw material to produce a produced gas and an unreacted char and for leading out the produced gas through a lead-out passage, a combustion furnace for heating a bed material by introducing and burning the unreacted char from the gasification furnace and for separating and supplying the bed material from a combustion exhaust gas to the gasification furnace and an exhaust heat recovery boiler for producing steam through heat exchange at least with the exhaust gas from the combustion furnace, the method comprising:

upon cold startup of the gasification facility, an air purge step of supplying a fluidizing air to the combustion and gasification furnaces to air-purge the combustion and gasification furnaces;

a combustion-furnace fluidized bed preheating step of supplying a fluidizing air to the combustion furnace to fluidize a combustion-furnace fluidized bed while a preheating fuel is supplied to the combustion furnace to preheat the combustion-furnace fluidized bed up to an autoignition temperature of coal;

a combustion-furnace coal charge/preheating fuel extinguishing step of charging a coal to the combustion furnace after the combustion-furnace fluidized bed is raised to the autoignition temperature of coal to heat the combustion-furnace fluidized bed with combustion of the coal while the supply of the preheating fuel is gradually reduced and stopped;

a circulation starting step of supplying the fluidizing air to the gasification furnace to fluidize a gasification-furnace fluidized bed to thereby supply the bed material in the gasification furnace to the combustion furnace while blow-up air is supplied to the combustion furnace to circulate the bed material in the combustion-furnace fluidized bed to the gasification furnace;

a startup purge step of gradually reducing the fluidizing air supplied to the gasification furnace while the steam from the exhaust heat recovery boiler in heat exchange with the exhaust gas from the combustion furnace is gradually increasingly supplied to the gasification furnace to purge the gasification furnace and a lead-out passage for the produced gas with the steam;

a gasification raw material charge step of supplying a raw material to the gasification furnace to start gasification of the raw material with the steam when a temperature of the combustion-furnace fluidized bed reaches a target temperature necessary for the gasification; and a raw material gasification operating step of gradually reducing and stopping the supply of the coal to the combustion furnace such that the target temperature is maintained in the combustion-furnace fluidized bed as the unreacted char is introduced into the combustion furnace, and upon shutdown of the gasification facility, a gasification-furnace raw material stopping step of gradually increasing the supply of the coal to the combustion furnace and gradually reducing and stopping the supply of the raw material to the gasification furnace such that the steam is continued to be produced by the exhaust heat recovery boiler;

a shutdown purge step of continuing the supply of the steam from the exhaust heat recovery boiler to the gasification furnace to purge the gasification furnace and the lead-out passage for the produced gas with the steam after the supply of the raw material to the gasification furnace is stopped; and a combustion-furnace coal stopping step of stopping the supply of the coal to the combustion furnace.

In the method of operating the gasification facility, preferably, at the same time of the combustion-furnace fluidized bed preheating step, the fluidizing air is also supplied to the gasification furnace for fluidization while the preheating fuel is supplied to the gasification furnace to concurrently preheat the gasification-furnace fluidized bed.

In the method of operating the gasification facility, preferably, when the gasification-furnace fluidized bed is concurrently preheated at the same time of the combustion-furnace fluidized bed preheating step, the exhaust gas discharged from the gasification furnace is allowed to flow into the exhaust gas from the combustion furnace.

In the method of operating the gasification facility, after the combustion-furnace coal stopping step, the supply of the fluidizing air to the combustion furnace may be stopped to retain the combustion furnace in a banking state.

In the method of operating the gasification facility, after the combustion-furnace coal stopping step, the fluidizing air may be supplied to the combustion and gasification furnaces to cool the gasification facility.

In the method of operating the gasification facility, LNG, LPG or light oil may be used as the preheating fuel.

ADVANTAGEOUS EFFECTS OF INVENTION

According to a method of operating a gasification facility, upon cold startup of the gasification facility, a fluidizing air is supplied to the combustion furnace to fluidize a combustion-furnace fluidized bed while a preheating fuel such as LNG, LPG or light oil is supplied to the combustion furnace to preheat the combustion-furnace fluidized bed up to an autoignition temperature of coal; the coal is then charged into the combustion furnace to heat the combustion-furnace fluidized bed with the combustion of the coal; and the bed material is then circulated between the combustion and gasification furnaces for heating, so that the used amount of the expensive preheating fuel such as LNG, LPG or light oil may be limited to a small amount only for preheating the combustion-furnace fluidized bed of the combustion furnace and, therefore, the cost for heating the bed material upon cold startup may be considerably reduced.

Upon startup of the gasification facility, a steam from an exhaust heat recovery boiler in heat exchange with an exhaust gas from the combustion furnace is supplied to the gasification furnace to purge the gasification furnace and a lead-out passage for a produced gas with the steam, so that the gasification furnace and the lead-out passage for the produced gas may be effectively and inexpensively purged with the steam utilizing the exhaust heat.

Upon shutdown of the gasification facility, the steam is continued to be produced in the exhaust heat recovery boiler and is supplied to the gasification furnace to purge the gasification furnace and the lead-out passage for the produced gas with the steam, so that the gasification furnace and the lead-out passage for the produced gas may be effectively and inexpensively purged with the steam utilizing the exhaust heat even when the gasification facility is stopped.

Figure 1:
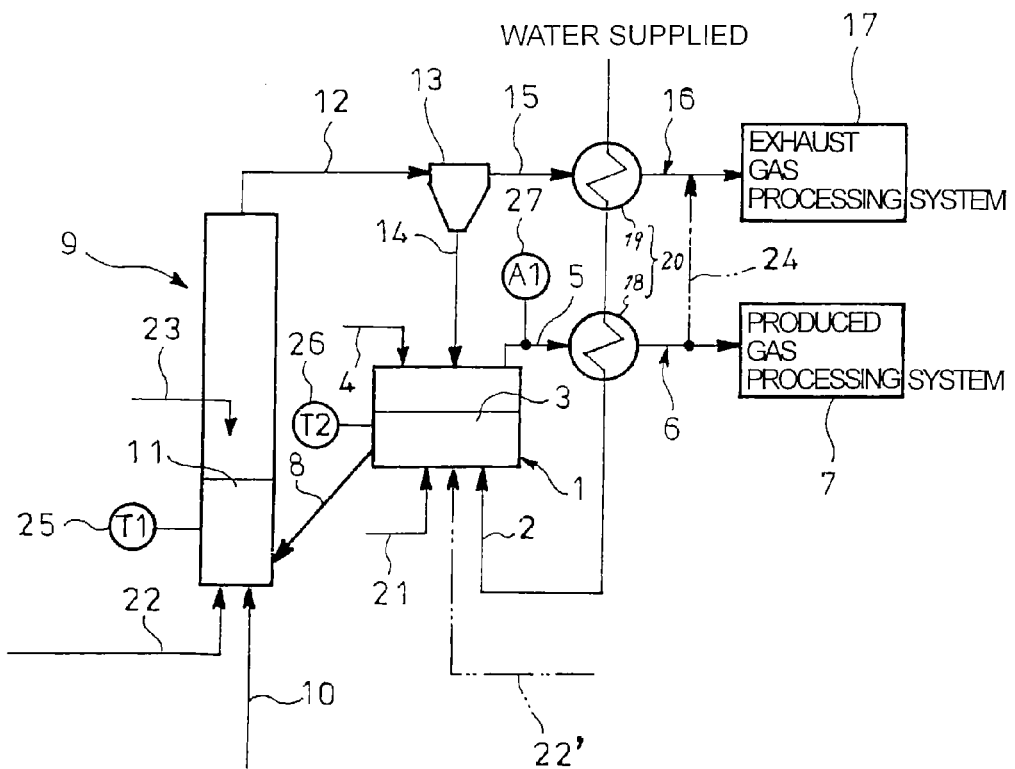
FIG. 1 is a schematic side elevation of a two-tower gasification facility which embodies the invention.

REFERENCE SIGNS LIST 1 gasification furnace
2 steam
3 gasification-furnace fluidized bed
4 raw material
5 produced gas
6 lead-out passage
9 combustion furnace
10 fluidizing air
10' blow-up air
11 combustion-furnace fluidized bed
14 bed material
15 exhaust gas
20 exhaust heat recovery boiler
21 fluidizing air
22 preheating fuel
22' preheating fuel
23 coal
Description of Embodiment An embodiment of the invention will be described with reference to the accompanying drawings.

FIG. 1 shows a two-tower gasification facility which embodies the invention. The gasification facility comprises gasification and combustion furnaces 1 and 9. In the gasification furnace 1, steam 2 is supplied from below from an air diffuser (not shown) to form a gasification-furnace fluidized bed 3 of bed material (such as silica sand or limestone) where a raw material 4 (such as coal, biomass or tire chips) charged from above is gasified to produce a produced gas and unreacted char. The produced gas 5 produced by the gasification furnace 1 is supplied through a lead-out passage 6 to a produced gas processing system 7. A mixture 8 of the unreacted char produced by the gasification furnace 1 with the bed material is introduced into the combustion furnace 9 by overflow.

In the combustion furnace 9, fluidizing air 10 is supplied from below from an air diffuser (not shown) to form a combustion-furnace fluidized bed 11 for burning the unreacted char supplied from the gasification furnace 1 to heat the bed material. A combustion exhaust gas 12 blown up due to fluidity is lead out through an upper portion of the combustion furnace 9, is introduced into a medium separator 13 such as a hot-cyclone and is separated into a bed material 14 and an exhaust gas 15. The separated bed material 14 is returned to the gasification furnace 1 and the exhaust gas 15 separated from the bed material 14 by the medium separator 13 is supplied through an exhaust gas passage 16 to an exhaust gas processing system 17.

Disposed in the lead-out passage 6 and the exhaust gas passage 16, respectively, are heat exchangers 18 and 19 which constitute an exhaust heat recovery boiler 20. Water is supplied to the heat exchangers 18 and 19 to produce steam 2 which is supplied from below to the gasification furnace 1.

Preheating fuel 22 such as LNG, LPG or light oil may be supplied from below to the combustion furnace 9 and coal 23 may be supplied from above to the combustion-furnace fluidized bed 11 of the combustion furnace 9. Fluidizing air 21 and preheating fuel 22' such as LNG, LPG or light oil may be supplied from below to the gasification furnace 1.

Provided between the lead-out passage 6 at an entry of the produced gas processing system 7 and the exhaust gas passage 16 at an entry of the exhaust gas processing system 17 is a bypass duct 24 for interconnection to allow an exhaust gas from the gasification furnace 1 to flow into the exhaust gas 15 from the combustion furnace 9. In FIG. 1, reference numeral 25 denotes a combustion furnace thermometer which measures a temperature of the combustion-furnace fluidized bed 11; 26, a gasification furnace thermometer which measures a temperature of the gasification-furnace fluidized bed 3; and 27, a gas component measuring device which measures an oxygen concentration ($O_2$ concentration) and a concentration of a flammable gas of the produced gas 5.

A method of operating the gasification facility shown in FIG. 1 will be described with reference to FIGS. 2 to 18 using simplified representations.

(I) Upon Cold Startup of Gasification Facility

Figure 2:
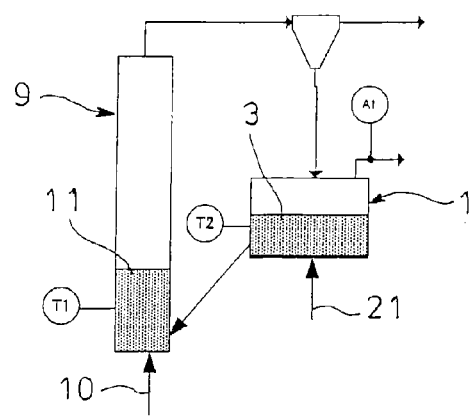
FIG. 2 is an explanatory diagram of an air purge step upon cold startup of a gasification facility.

As shown in FIG. 2, the fluidizing airs 10 and 21 are supplied to the combustion and gasification furnaces 9 and 1, respectively, to air-purge the furnaces 9 and 1 (air purge step). The air purge step is performed based on an operation regulation implemented in a normal fluidized bed boiler. The supply of the fluidizing air 10 to the gasification furnace 1 may be once stopped after the air purge is completed; alternatively, the supply of the fluidizing air 10 to the gasification furnace 1 may be continued for ventilation/fluidization in a case where the gasification facility has an air preheater since exhaust heat of the exhaust gas may contribute to temperature rise in the gasification-furnace fluidized bed 3.

Figure 3:
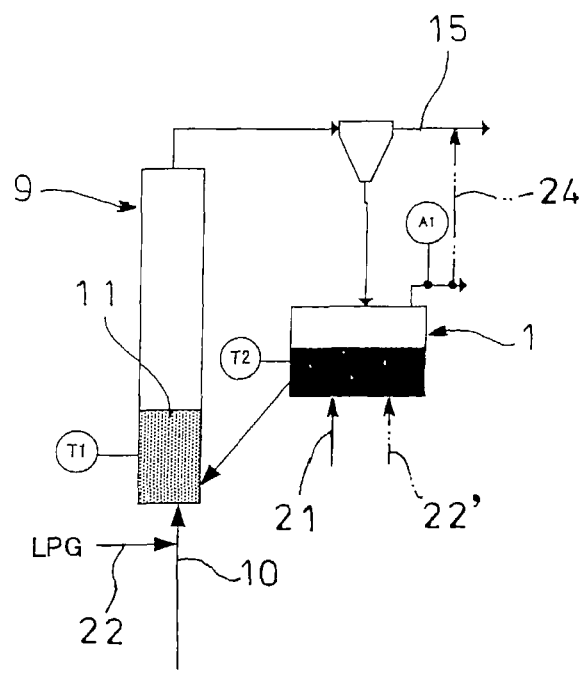
FIG. 3 is an explanatory diagram of a combustion-furnace fluidized bed preheating step.

Then, as shown in FIG. 3, the preheating fuel 22 (LPG) is supplied to and burned in the combustion furnace 9 while the fluidized air 10 is supplied to the combustion furnace for fluidization of the combustion-furnace fluidized bed 11, thus preheating the combustion-furnace fluidized bed 11 (combustion-furnace fluidized bed preheating step).

Figure 4:
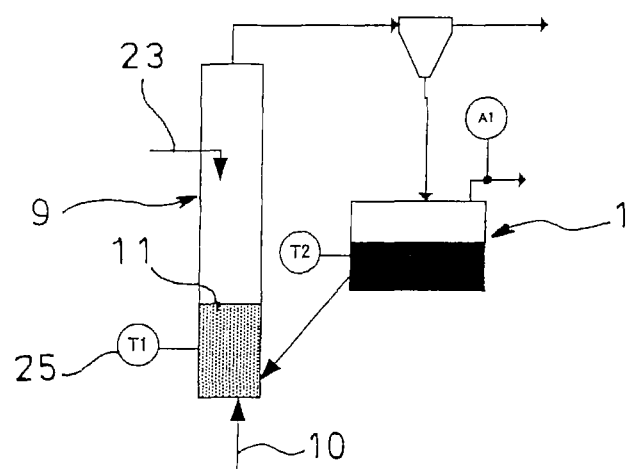
FIG. 4 is an explanatory diagram of a combustion-furnace coal charge/preheating fuel extinguishing step.

As shown in FIG. 4, when the temperature of the combustion-furnace fluidized bed 11 detected by the combustion furnace thermometer 25 reaches an autoignition temperature of coal (480° C.), charge of the coal 23 to the combustion furnace 9 is started to heat the combustion-furnace fluidized bed 11 by the combustion of the coal 23 while the supply of the preheating fuel 22 is gradually reduced and stopped (combustion-furnace coal charge/preheating fuel extinguishing step).

Figure 5:
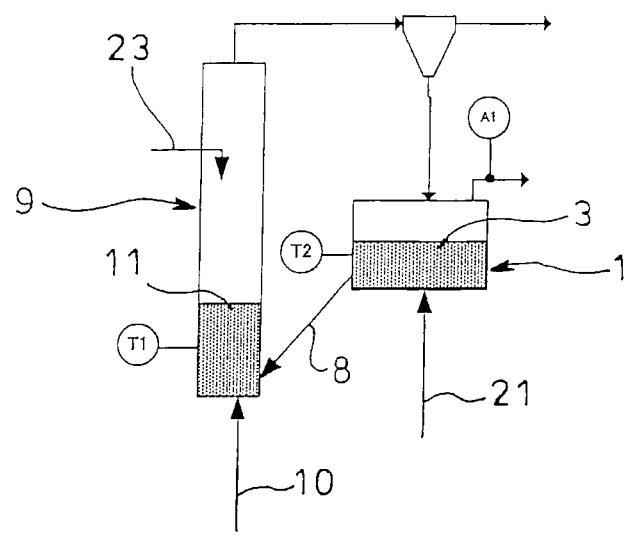
FIG. 5 is an explanatory diagram of a state of starting fluidization of a gasification-furnace fluidized bed.
Figure 6:
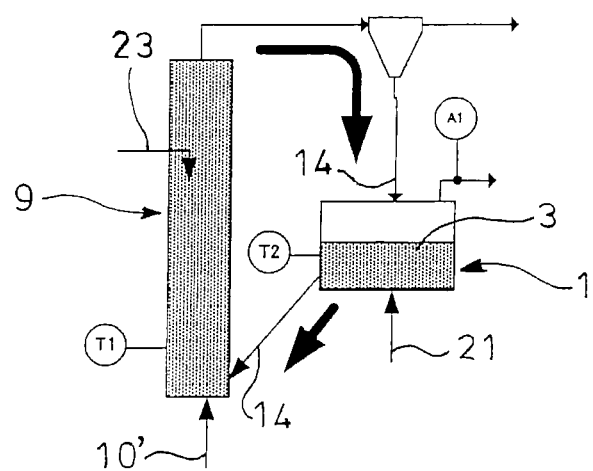
FIG. 6 is an explanatory diagram of a circulation starting step.

Then, as shown in FIG. 5, the fluidizing air 21 is supplied to the gasification furnace 1 to fluidize the gasification-furnace fluidized bed 3 for supply of the bed material 14 in the gasification furnace 1 into the combustion furnace 9 while, as shown in FIG. 6, blow-up air 10' with an amount of air more than that of the fluidizing air 10 is supplied to the combustion furnace 9 to thereby return the bed material 14 in the combustion-furnace fluidized bed 11 to the gasification furnace 1 and start the circulation (circulation starting step).

Figure 7:
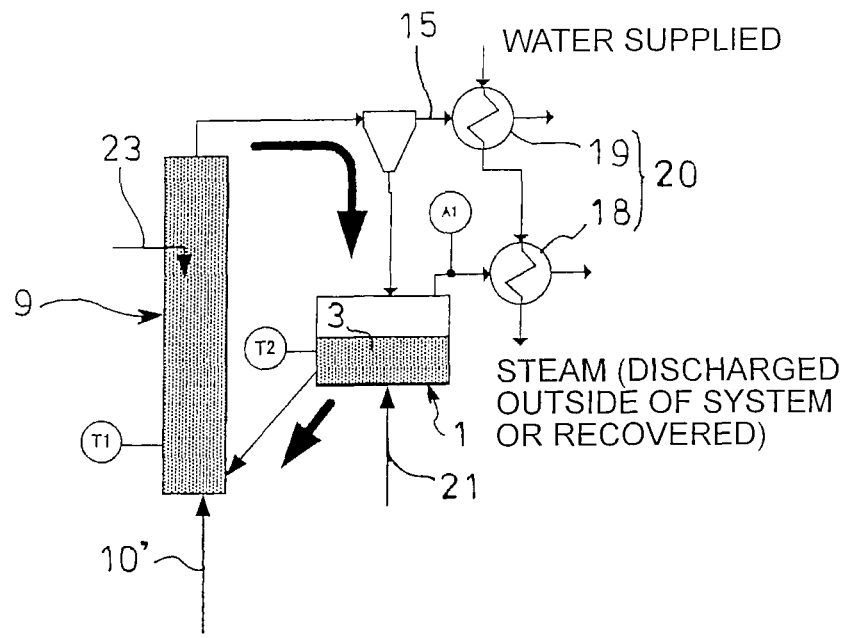
FIG. 7 is an explanatory diagram of a state of starting the production of steam.
Figure 8:
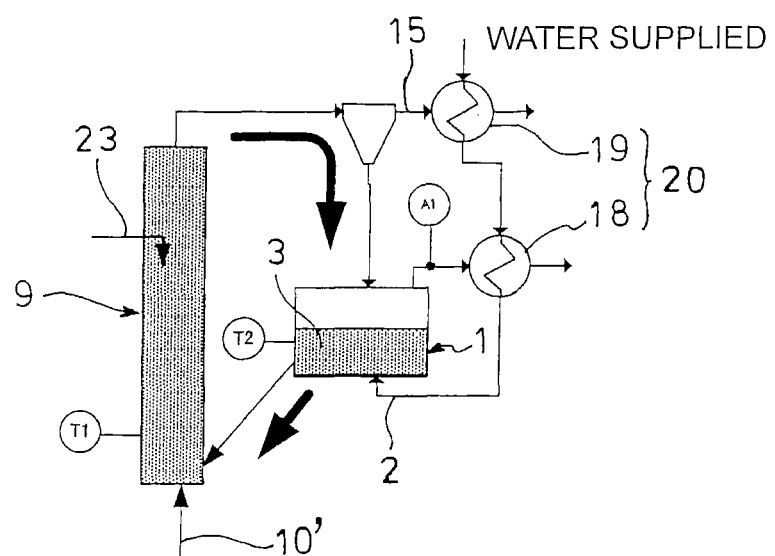
FIG. 8 is an explanatory diagram of a state of charging steam into a gasification furnace.
Figure 9:
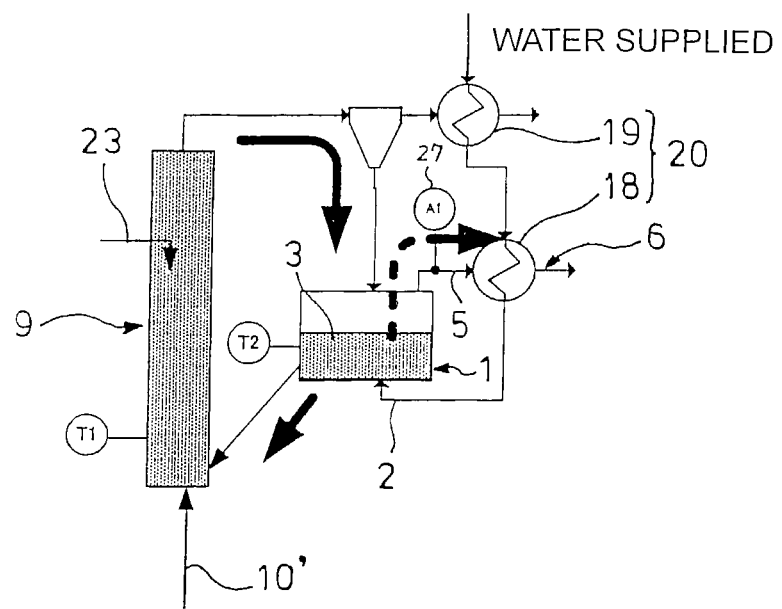
FIG. 9 is an explanatory diagram of a startup purge step.

Since the charge amount of the coal 23 is increased to circulate the bed material 14, the gasification-furnace fluidized bed 3 is heated toward a target temperature necessary for the gasification of coal, which is 900 to 1000° C., and at this timing, the exhaust heat recovery boiler 20 starts to produce the steam 2 as shown in FIG. 7. The steam 2 is discharged outside of the system or recovered. When the steam 2 of the exhaust heat recovery boiler 20 reaches a pressure capable of fluidizing the gasification-furnace fluidized bed 3, the steam 2 is supplied from below to the gasification furnace 1 as shown in FIG. 8. A switch-over is performed at this timing in an overlapping manner such that the supply amount of the fluidizing air 21 already supplied to the gasification furnace 1 is gradually reduced while the supply of the steam 2 from the exhaust heat recovery boiler 20 is gradually increased. As a result, residual air in the gasification furnace 1 and in the lead-out passage 6 of the produced gas is purged by the steam 2 as shown in FIG. 9 (startup purge step). The startup purging is continued until the oxygen concentration ($O_2$ concentration) measured by the gas component measuring device 27 attains a set concentration close to zero.

Figure 10:
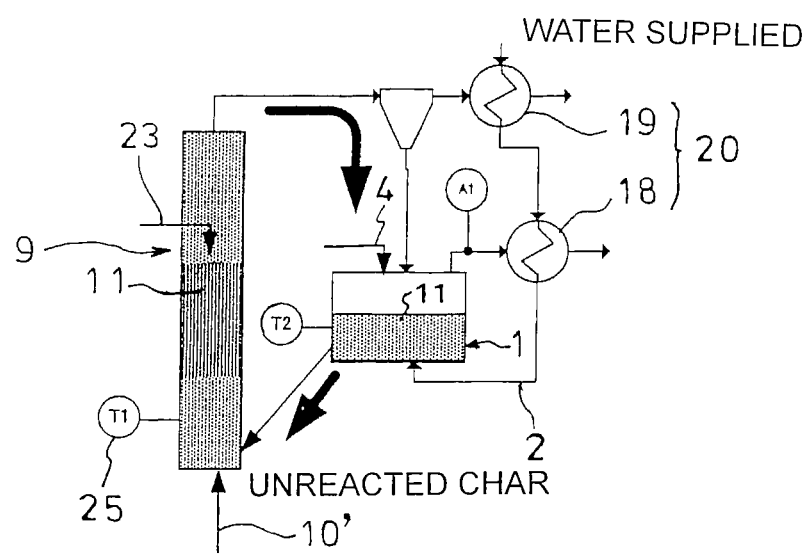
FIG. 10 is an explanatory diagram of a state of charging gasification raw material into the gasification furnace.

As shown in FIG. 10, when the temperature of the combustion-furnace fluidized bed 11 detected by the combustion furnace thermometer 25 reaches a target temperature necessary for the gasification (900 to 1000° C.), the raw material 4 (coal) is charged into the gasification furnace 1 to start the gasification of the raw material 4 with the steam 2 (gasification raw material charge step).

Figure 11:
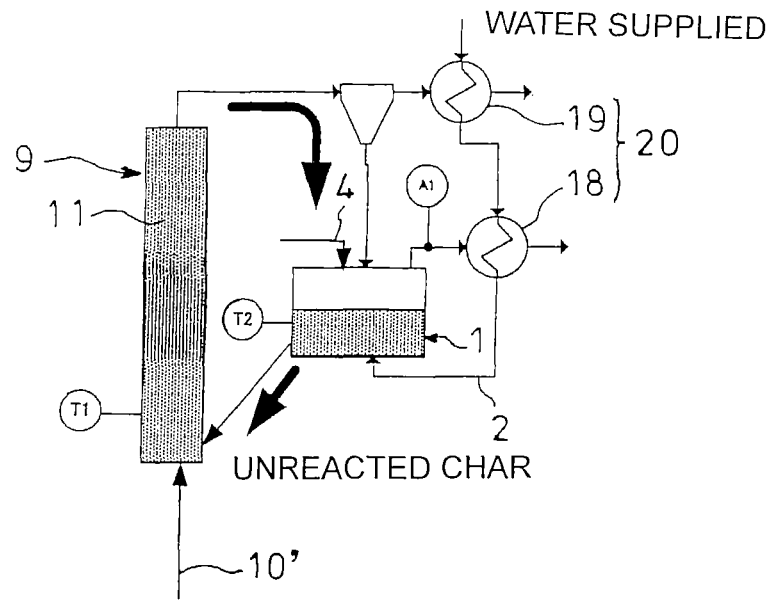
FIG. 11 is an explanatory diagram of a gasification operating step.
Figure 12:
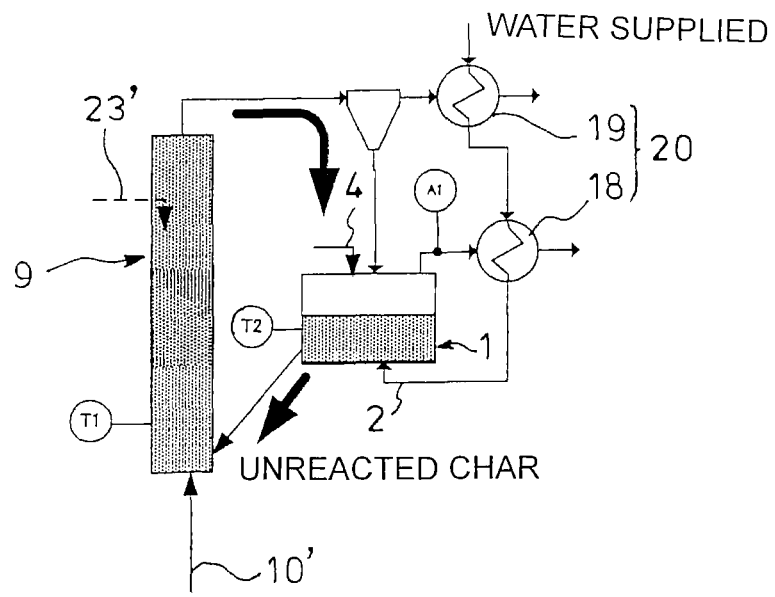
FIG. 12 is an explanatory diagram of a state of performing aid combustion for retaining the temperature in the gasification operation.

The unreacted char is supplied to the combustion furnace 9 due to the charge of the raw material 4 into the gasification furnace 1. Since this increases an amount of combustion occurring in the combustion furnace 9, the supply of the coal 23 to the combustion furnace 9 is gradually reduced and stopped as shown in FIG. 11 such that the target temperature is maintained in the combustion-furnace fluidized bed 11 as the unreacted char is introduced into the combustion furnace 9 (gasification operating step). If the temperature of the combustion-furnace fluidized bed 11 goes lower than the target temperature in the gasification operation, coal 23' may be supplementarily supplied to the combustion furnace 9 for combustion aid as shown in FIG. 12 such that the combustion-furnace fluidized bed 11 is maintained at the target temperature.

As above, upon cold startup of the gasification facility, the fluidizing air 10 is supplied to the combustion furnace 9 to fluidize the combustion-furnace fluidized bed 11 while the preheating fuel 22 such as LNG, LPG or light oil is supplied to preheat the combustion-furnace fluidized bed 11 up to the autoignition temperature of coal. Thereafter, the coal 23 is charged into the combustion furnace 9 to heat the combustion-furnace fluidized bed 11 with the combustion of the coal 23. Then, the bed material 14 is circulated between the combustion and gasification furnaces 9 and 1 for heating. Thus, the used amount of the expensive preheating fuel 22 such as LNG, LPG or light oil may be limited to a small amount only for preheating the combustion-furnace fluidized bed 11 of the combustion furnace 9 and, therefore, the cost for heating the bed material upon cold startup may be considerably reduced.

Upon startup of the gasification facility, the steam 2 from the exhaust heat recovery boiler 20 in heat exchange with the exhaust gas 15 from the combustion furnace 9 is supplied to the gasification furnace 1 to purge the gasification furnace 1 and the lead-out passage 6 for the produced gas 5 with the steam 2, so that the gasification furnace 1 and the lead-out passage 6 for the produced gas 5 may be effectively and inexpensively purged with the steam 2 utilizing the exhaust heat.

In the operation upon cold startup of the gasification facility, at the same time of the combustion-furnace fluidized bed preheating step shown in FIG. 3, the fluidizing air 10 may be also supplied to the gasification furnace 1 to fluidize the gasification-furnace fluidized bed 3 while the preheating fuel 22' may be supplied to concurrently preheat the gasification-furnace fluidized bed 3, which enables the bed material to be quickly raised in temperature to reduce the time until the start of gasification by the charge of raw material into the gasification facility.

In the operation upon cold startup of the gasification facility, when the preheating fuel 22' is supplied to the gasification furnace 1 to preheat the gasification-furnace fluidized bed 3 at the same time of the combustion-furnace fluidized bed preheating step as shown in FIG. 3, the exhaust gas discharged from the gasification furnace 1 may be allowed to flow into the exhaust gas 15 from the combustion furnace 9 through the bypass duct 24. Since the exhaust gas processing system 17 is disposed in the exhaust gas passage 16 for the combustion furnace 9 as shown in FIG. 1, this allows the exhaust gas discharged from the gasification furnace 1 to be processed by the exhaust gas processing system 17 to prevent the exhaust gas from the gasification furnace 1 from being introduced into the produced gas processing system 7.

(II) Upon Shutdown of Gasification Facility

Figure 13:
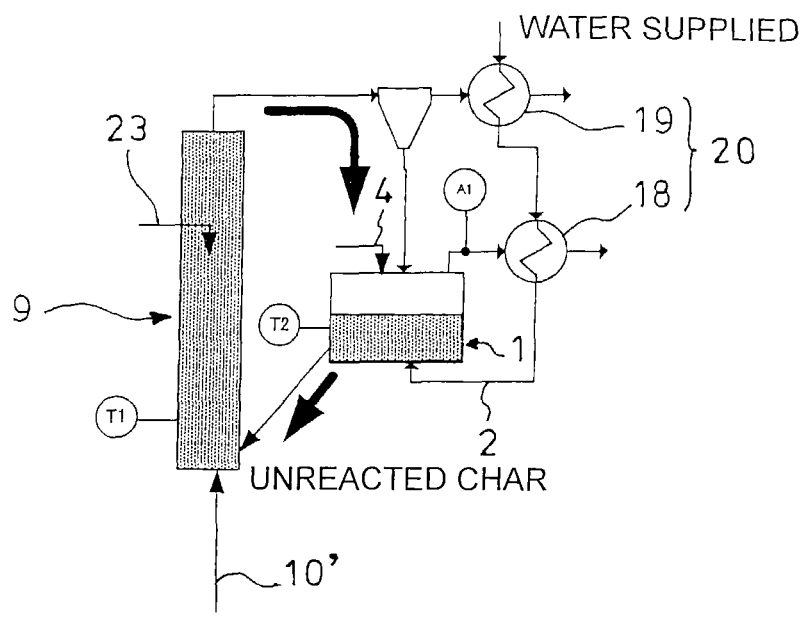
FIG. 13 is an explanatory diagram of a state of charging coal into the combustion furnace upon shutdown of the gasification facility.
Figure 14:
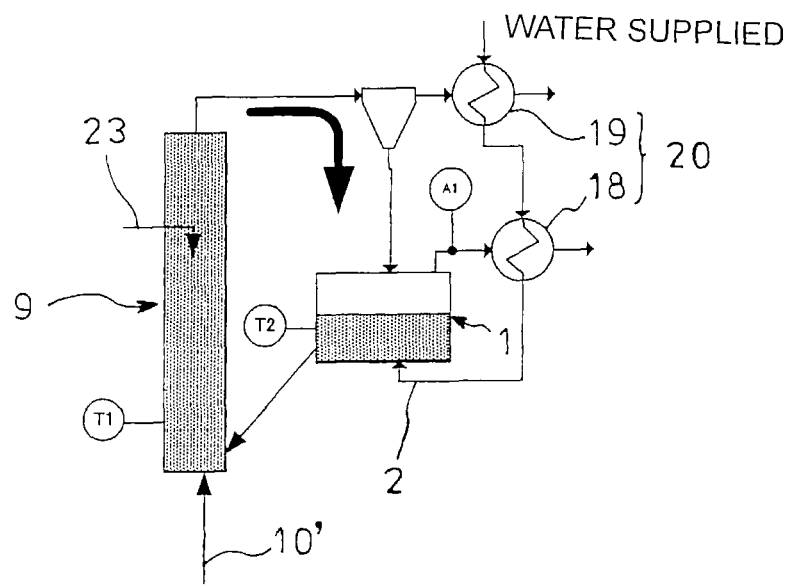
FIG. 14 is an explanatory diagram of a gasification furnace raw material stopping step.

In order to stop the gasification operation of the gasification facility, the coal 23 is gradually increased and supplied to the combustion furnace 9 such that the steam 2 is continued to be produced by the exhaust heat recovery boiler 20 as shown in FIG. 13 while the supply of the raw material 4 to the gasification furnace 1 is gradually reduced and stopped as shown in FIG. 14 (gasification-furnace raw material stopping step).

Figure 15:
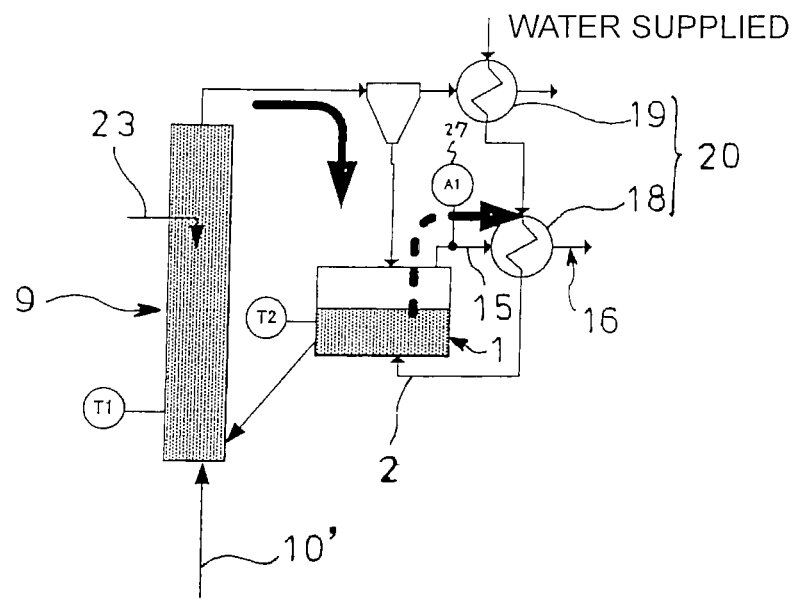
FIG. 15 is an explanatory diagram of a shutdown purge step.

After the supply of the raw material 4 to the gasification furnace 1 is stopped, as shown in FIG. 15, the blow-up air 10' is supplied to the combustion furnace 9 and the steam 2 from the exhaust heat recovery boiler 20 is continued to be supplied to the gasification furnace 1 to purge the gasification furnace 1 and the lead-out passage 6 for the produced gas 5 with the steam 2 (shutdown purge step). At the shutdown purge step, the purging is performed until the concentration of the flammable gas measured by the gas component measuring device 27 attains a set concentration close to zero.

Figure 16:
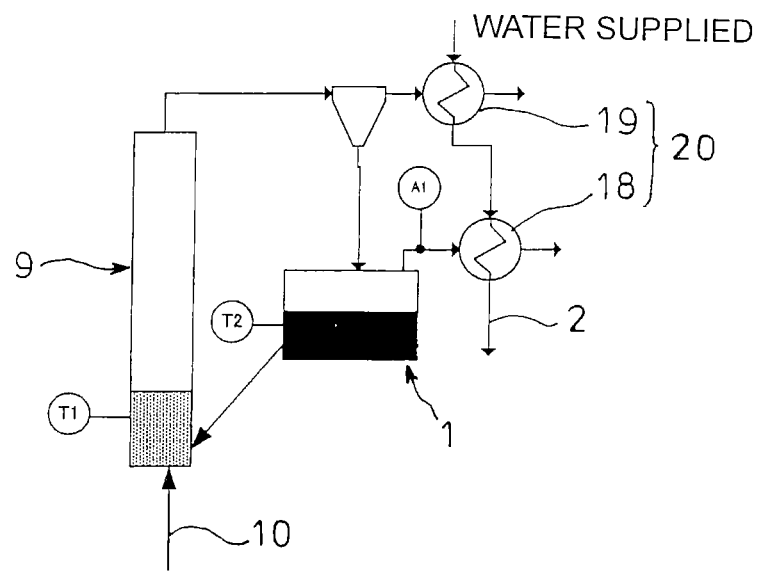
FIG. 16 is an explanatory diagram of a state of stopping the input of coal into the combustion furnace.

Then, as shown in FIG. 16, the supply of the coal 23 to the combustion furnace 9 is stopped (combustion-furnace coal stopping step).

As above, upon shutdown of the gasification in the gasification facility, the steam 2 is continued to be produced by the exhaust heat recovery boiler 20 and is supplied to the gasification furnace 1 to purge the gasification furnace 1 and the lead-out passage 6 for the produced gas 5 with the steam 2, so that the gasification furnace 1 and the lead-out passage 6 for the produced gas 5 may be effectively and inexpensively purged with the steam 2 utilizing the exhaust heat even upon shutdown of the gasification facility.

Figure 17:
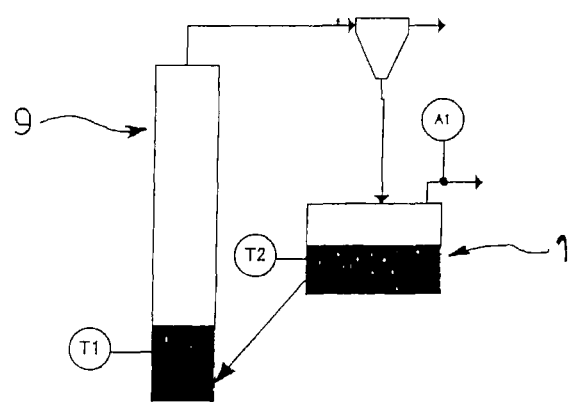
FIG. 17 is an explanatory diagram of a state of retaining the combustion furnace in a banking state.

In the operation upon shutdown of the gasification facility, after the combustion-furnace coal stopping step shown in FIG. 16, the supply of the fluidizing air 10 to the combustion furnace 9 is stopped as shown in FIG. 17 to retain the combustion furnace 9 in a banking state and this enables the temperature to be kept in the bed material of the combustion furnace 9, which is advantageous when the gasification facility is restarted.

Figure 18:
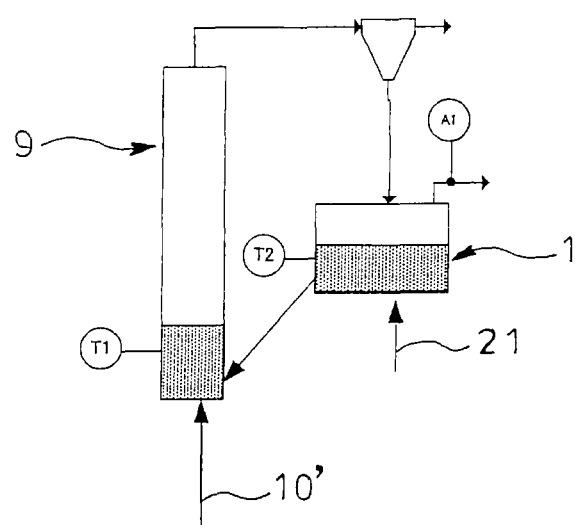
FIG. 18 is an explanatory diagram of a state of supplying fluidizing air into the combustion and gasification furnaces to cool the gasification facility.

In the operation of the gasification facility, after the combustion-furnace coal stopping step shown in FIG. 16, the fluidizing air 10 may be supplied to the combustion furnace 9 and the fluidizing air 21 may be supplied to the gasification furnace 1 as shown in FIG. 18 to cool the gasification facility.

It is to be understood that a method of operating a gasification facility according to the invention is not limited to the above embodiment and that various changes and modifications may be made without departing from the scope of the invention.

Industrial Applicability

A method of operating a gasification facility of the invention is applicable to a gasification facility having gasification and combustion furnaces so as to reduce a cost required for heating a bed material especially upon cold startup of the gasification facility and so as to effectively and inexpensively purge the gasification furnace and a lead-out passage for a produced gas.

The invention claimed is:

1. A method of operating a gasification facility comprising:
   a gasification furnace for gasifying a raw material to produce a produced gas and an unreacted char and for leading out the produced gas through a lead-out passage;
   a combustion furnace for heating a bed material by introducing and burning the unreacted char from the gasification furnace and for separating and supplying the bed material from a combustion exhaust gas to the gasification furnace; and
   an exhaust heat recovery boiler for producing steam through heat exchange at least with the exhaust gas from the combustion furnace,
   the method comprising:
   upon cold startup of the gasification facility,
   A) supplying a fluidizing air to the combustion and gasification furnaces to air-purge the combustion and gasification furnaces;
   B) supplying a fluidizing air to the combustion furnace to fluidize a combustion-furnace fluidized bed while supplying a preheating fuel to the combustion furnace to preheat the combustion-furnace fluidized bed up to an autoignition temperature of coal;
   C) charging a coal to the combustion furnace after raising the combustion-furnace fluidized bed to the autoignition temperature of coal to heat the combustion-furnace fluidized bed with combustion of the coal while gradually reducing and stopping the supplying of the preheating fuel;

D) supplying the fluidizing air to the gasification furnace to fluidize a gasification-furnace fluidized bed and thereby supplying the bed material in the gasification furnace to the combustion furnace while supplying blow-up air to the combustion furnace to circulate the bed material in the combustion-furnace fluidized bed to the gasification furnace;

E) gradually reducing the fluidizing air supplied to the gasification furnace while gradually increasingly supplying the steam from the exhaust heat recovery boiler in heat exchange with the exhaust gas from the combustion furnace to the gasification furnace to purge the gasification furnace and a lead-out passage for the produced gas with the steam;

F) supplying a raw material to the gasification furnace to start gasification of the raw material with the steam when a temperature of the combustion-furnace fluidized bed reaches a target temperature necessary for the gasification; and G) gradually reducing and stopping supplying the coal to the combustion furnace such that the target temperature is maintained in the combustion-furnace fluidized bed as the unreacted char is introduced into the combustion furnace, and upon shutdown of the gasification facility, H) gradually increasing supplying the coal to the combustion furnace and gradually reducing and stopping the supply of the raw material to the gasification furnace such that the steam is continued to be produced by the exhaust heat recovery boiler;

I) continuing supplying the steam from the exhaust heat recovery boiler to the gasification furnace to purge the gasification furnace and the lead-out passage for the produced gas with the steam after the supply of the raw material to the gasification furnace is stopped; and J) stopping supplying the coal to the combustion furnace.

2. The method of claim 1, wherein, at the same time as the supplying B), the fluidizing air is also supplied to the gasification furnace for fluidization while the preheating fuel is supplied to the gasification furnace to concurrently preheat the gasification-furnace fluidized bed.

3. The method of claim 2, when the gasification-furnace fluidized bed is concurrently preheated at the same time as the supplying B), the exhaust gas discharged from the gasification furnace is allowed to flow into the exhaust gas from the combustion furnace.

4. The method of claim 1, wherein, after the stopping supplying J), the supply of the fluidizing air to the combustion furnace is stopped to retain the combustion furnace in a banking state.

5. The method of claim 1, wherein, after the stopping supplying J), the fluidizing air is supplied to the combustion and gasification furnaces to cool the gasification facility.

6. The method of claim 1, wherein LNG, LPG, or light oil is the preheating fuel.

7. The method of claim 2, wherein LNG, LPG, or light oil is the preheating fuel.

* * * * *